United States Patent [19]

Jaster

[11] Patent Number: 5,435,145

[45] Date of Patent: Jul. 25, 1995

[54] REFRIGERANT FLOW RATE CONTROL BASED ON LIQUID LEVEL IN SIMPLE VAPOR COMPRESSION REFRIGERATION CYCLES

[75] Inventor: Heinz Jaster, Schenectady, N.Y.

[73] Assignee: General Electric Company, Schenectady, N.Y.

[21] Appl. No.: 205,855

[22] Filed: Mar. 3, 1994

[51] Int. Cl.⁶ .................. F25B 41/04; F16K 31/18
[52] U.S. Cl. ......................... 62/115; 62/218; 137/412; 251/129.05; 236/75
[58] Field of Search ............... 62/222, 218, 509, 115, 62/188; 236/46 F, 75; 251/129.05; 137/412

[56] References Cited

U.S. PATENT DOCUMENTS

| | | | |
|---|---|---|---|
| 3,698,204 | 10/1972 | Schlotterbeck et al. | 62/206 |
| 3,874,407 | 4/1975 | Griswold | 251/129 X |
| 4,167,858 | 9/1979 | Kojima et al. | 62/126 |
| 4,651,535 | 3/1987 | Alsenz | 62/225 |
| 4,653,288 | 3/1987 | Sayo et al. | 62/210 |
| 4,677,830 | 7/1987 | Sumikawa et al. | 62/126 |
| 4,745,767 | 5/1988 | Ohya et al. | 62/211 |
| 4,838,037 | 6/1989 | Wood | 62/225 |
| 4,910,972 | 3/1990 | Jaster | 62/335 |
| 5,094,086 | 3/1992 | Shyu | 62/218 |
| 5,247,989 | 9/1993 | Benevelli | 165/30 |
| 5,255,529 | 10/1993 | Powell et al. | 62/180 |
| 5,255,530 | 10/1993 | Janke | 62/180 |

OTHER PUBLICATIONS

Buxton, Joseph, "Solid State Circuits Simplify Temperature Sensing & Control," Electronic Component News, vol. 37, No. 10, ECN Sensors Supplement, Oct. 1993.

*Primary Examiner*—William E. Wayner
*Attorney, Agent, or Firm*—Patrick R. Scanlon; Paul R. Webb, II

[57] ABSTRACT

Pulse width modulation is used to control the flow rate through a solenoid expansion valve in a refrigeration system using a simple vapor compression cycle. The refrigeration cycle includes a phase separator which receives two phase refrigerant from the condenser and supplies liquid refrigerant to the pulse width modulated solenoid valve. A liquid level sensor is disposed in the phase separator, and a controller for controlling the duty cycle of the pulse width modulated solenoid valve is provided to receive input from the liquid level sensor. The liquid level sensor can be of the type which provides a continuously variable signal as a function of liquid level, or it can be a liquid level switch which controls valve duty cycle on the basis of whether the phase separator liquid level is above or below a set level. Alternatively, two liquid level switches can be provided.

5 Claims, 2 Drawing Sheets

REFRIGERANT FLOW RATE CONTROL BASED ON LIQUID LEVEL IN SIMPLE VAPOR COMPRESSION REFRIGERATION CYCLES

CROSS REFERENCES TO RELATED APPLICATIONS

This application is related to copending application entitled "Refrigerant Flow Rate Control Based on Liquid Level in Dual Evaporator Two-Stage Refrigeration Cycles," Ser. No. 08/205,859, filed concurrently herewith and assigned to the same assignee as the present invention.

BACKGROUND OF THE INVENTION

This invention relates generally to refrigerant expansion control in refrigeration systems and more particularly concerns using pulse width modulated solenoid valves for expansion control. As used herein, the term "refrigeration system" refers to refrigerators, air conditioners or any other system which produces a refrigeration effect.

Conventional refrigeration systems used in household refrigerators typically operate on the simple vapor compression cycle. Such a cycle includes a compressor, a condenser, a phase separator, an expansion device, and an evaporator all connected in series in the order given and charged with a refrigerant. The refrigerant is compressed by the compressor to high temperature and pressure and then condensed by the condenser where it loses heat to the ambient. Refrigerant from the condenser enters the phase separator, and liquid refrigerant is discharged to an expansion device, such as an expansion valve or a capillary tube, so that it undergoes adiabatic expansion. The now low pressure refrigerant flows through the evaporator and is vaporized by absorbing heat from air passing over the evaporator. The cooled air is used to refrigerate one or more refrigerator compartments. The gaseous or mostly gaseous refrigerant exiting the evaporator is returned to the compressor via a suction line to repeat the cycle.

Household refrigerators typically use a capillary tube to control refrigerant expansion because it is a simple, low cost device. However, capillary tubes have a number of limitations as expansion devices. For instance, capillary tubes must be made very long to allow an inside diameter which is manufacturable and large enough to avoid clogging. This needed length takes up space in the refrigerator. The use of capillary tube expansion control also requires very precise refrigerant charging operations during production because the flow rate through the capillary tube is highly sensitive to the amount of refrigerant charge in the system.

Furthermore, a capillary tube can be sized to provide the optimum refrigerant flow rate for only one operating condition. Capillary tubes are thus typically sized to provide the optimum flow rate for normal operating conditions. This means that when the refrigeration cycle begins (as well as under high load conditions), the capillary tube is undersized, and the evaporator is starved of refrigerant. This reduces the cooling capacity and efficiency of the refrigerator. Near the end of the refrigeration cycle, the capillary tube will be oversized and the evaporator will be flooded, again reducing efficiency. Because of this, cycle efficiency using capillary tube expansion is considerably below that attainable with active expansion control.

However, active expansion control, in the form of conventional thermostatic expansion valves, does not work well in household refrigerators. While thermostatic expansion valves are often used in automotive air conditioning and commercial refrigeration systems which have large refrigerant flow rates, they cannot be made with orifices small enough to regulate the very low flow rates (typically 10–12 lb/hr) of household refrigerators. That is, to achieve the required pressure drop the valve orifice would need to be on the order of 10 mils or less, a size that is impractical to manufacture and very susceptible to plugging.

Accordingly, there is a need for an alternative to capillary tubes and thermostatic expansion valves as expansion control in household refrigerators.

SUMMARY OF THE INVENTION

The above-mentioned needs are met by the present invention which uses a pulse width modulated solenoid valve for expansion control. A pulse width modulated control signal is generated for cyclically opening and closing the valve. The pulse width of the control signal determines the average flow rate through the valve. The duty cycle of the valve is varied in accordance with liquid level in the phase separator to precisely control the average flow rate.

Specifically, the present invention provides a refrigeration system comprising a compressor, a condenser, a phase separator, a pulse width modulated solenoid valve, and an evaporator all connected in a closed series loop. A liquid level sensor is disposed in the phase separator. A controller for controlling the duty cycle of the pulse width modulated solenoid valve is provided. The controller has an input connected to the liquid level sensor and thus controls the duty cycle on the basis of the liquid level.

The liquid level sensor can be of the type which provides a continuously variable signal as a function of liquid level, or it can be a liquid level switch. In the latter case, the controller produces a control signal having a first pulse width when the phase separator liquid level is above the liquid level switch and produces a control signal having a second, smaller pulse width when the liquid level is below the liquid level switch. Alternatively, two liquid level switches can be provided. In which case, the controller increases the pulse width of its control signal when the liquid level is above the upper liquid level switch and decreases the pulse width of its control signal when the liquid level is below the lower liquid level switch.

Several advantages are realized by using a pulse width modulated solenoid valve for expansion control. Because of its oscillating manner of operation, the pulse width modulated solenoid valve can be made with a larger orifice, thereby avoiding plugging problems. Systems using pulse width modulated control are relatively insensitive to total refrigerant charge which eases charging requirements during production. Pulse width modulated solenoid valves are beneficial for use with variable and/or multi-speed compressors because of the ability to match different flow rates as the compressor displacement changes. During the off cycle, a pulse width modulation solenoid valve can be used to maintain a positive seal between the high and low pressures, thereby preventing refrigerant migration and conserving energy. The solenoid valve therefore acts as an energy valve, eliminating the need for a separate valve to serve this function.

Phase separator liquid level provides a convenient basis for regulating refrigerant flow because it can be monitored with a single sensor. Furthermore, "hunting" can be avoided because of the proximity of the phase separator to the expansion valve.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
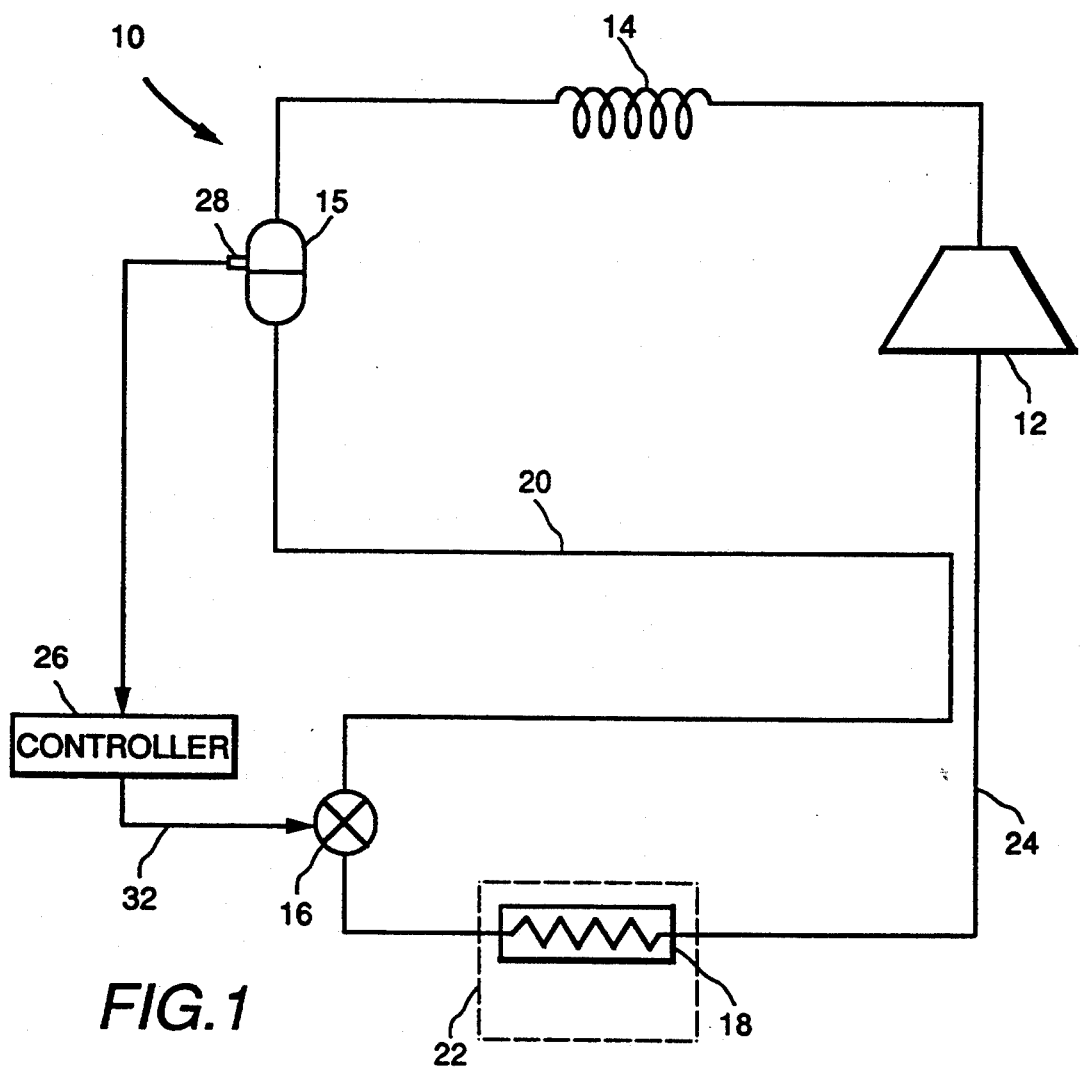
FIG. 1 is a schematic representation of one embodiment of a refrigeration cycle in accordance with the present invention.

Referring to the drawings wherein identical reference numerals denote the same elements throughout the various views, FIG. 1 shows a refrigeration system 10 comprising a compressor 12, a condenser 14, a phase separator 15, an expansion valve 16, and an evaporator coil 18, all connected in a closed series loop in the order given. The refrigeration system 10 is charged with a refrigerant which is first compressed in the compressor 12. The compressed refrigerant is then discharged to the condenser 14, where it is cooled and condensed. Next, the refrigerant flows into the phase separator 15. The phase separator 15 is an enlarged tube section or bottle and is arranged to collect liquid refrigerant in the bottom thereof, while any gaseous refrigerant is stored in the upper portion of the phase separator 15. Liquid refrigerant from the bottom of the phase separator 15 is expelled into a liquid line 20 and then flows through the expansion valve 16, expanding while it does so. The refrigerant exits from the expansion valve 16 into the evaporator 18 which is preferably disposed within a compartment 22.

As the refrigerant flows through the evaporator 18, it is in a heat exchange relationship with the air in the compartment 22. Thus, heat is transferred from the compartment 22 to the refrigerant flowing through the evaporator 18, causing the liquid refrigerant to evaporate. The refrigerant preferably assumes a superheated gaseous state by the time it exits the evaporator 18. The gaseous refrigerant is then passed through a suction line 24 and returned to the compressor 12, where the cycle is repeated. As shown schematically in FIG. 1, the liquid line 20 and the suction line 24 (or at least portions thereof) are placed in thermal contact with one another in a countercurrent heat exchange relationship (e.g., soldered together) so as to improve cycle efficiency.

The expansion valve 16 is the throttling or metering device which controls the operation of the refrigeration system 10. In accordance with the present invention, the expansion valve 16 is a pulse width modulated solenoid valve which is controlled by a controller 26 as part of a feedback loop. The controller 26 controls the expansion valve 16 on the basis of the liquid level in the phase separator 15. Specifically, the valve 16 is controlled in accordance with the phase separator liquid level so as to maintain zero condenser subcooling. Subcooling refers to cooling the liquid refrigerant in the condenser 14 to a temperature below the saturated temperature of the refrigerant at the same pressure. Extensive condenser subcooling means that the condenser 14 will contain an excessive amount of liquid refrigerant, thereby depriving the evaporator 18 of sufficient charge. Also, condenser subcooling causes the saturated temperature in the condenser 14 to increase. Both of these conditions have an adverse impact on cycle efficiency. Accordingly, it is desirable to maintain nearly zero condenser subcooling.

In vapor compression cycle refrigeration systems, condenser subcooling can be detected by monitoring the liquid level in the phase separator 15. This is because subcooling is not present as long as the condenser 14 is discharging two phase refrigerant. If subcooling is present, only liquid refrigerant is discharged from the condenser 14, and the liquid level in the phase separator 15 will increase. Thus, an increasing liquid level will indicate probable existence of condenser subcooling.

In the present invention, the phase separator 15 is provided with a liquid level sensor 28. The liquid level sensor 28 detects the liquid level in the phase separator 15 and produces an output signal corresponding to the detected level. The controller 26 receives the output signal and produces a control signal 32 which is fed to the solenoid valve 16. The control signal 32 is a pulse width modulated frequency signal which causes the valve 16 to oscillate between a fully open condition and a fully closed condition such that the duty cycle of the open-to-closed conditions determines the average flow rate through the expansion valve 16. The pulse width is adjusted in accordance with the detected liquid level to control the duty cycle of the valve 16 to maintain zero condenser subcooling for optimal system performance.

Figure 2:
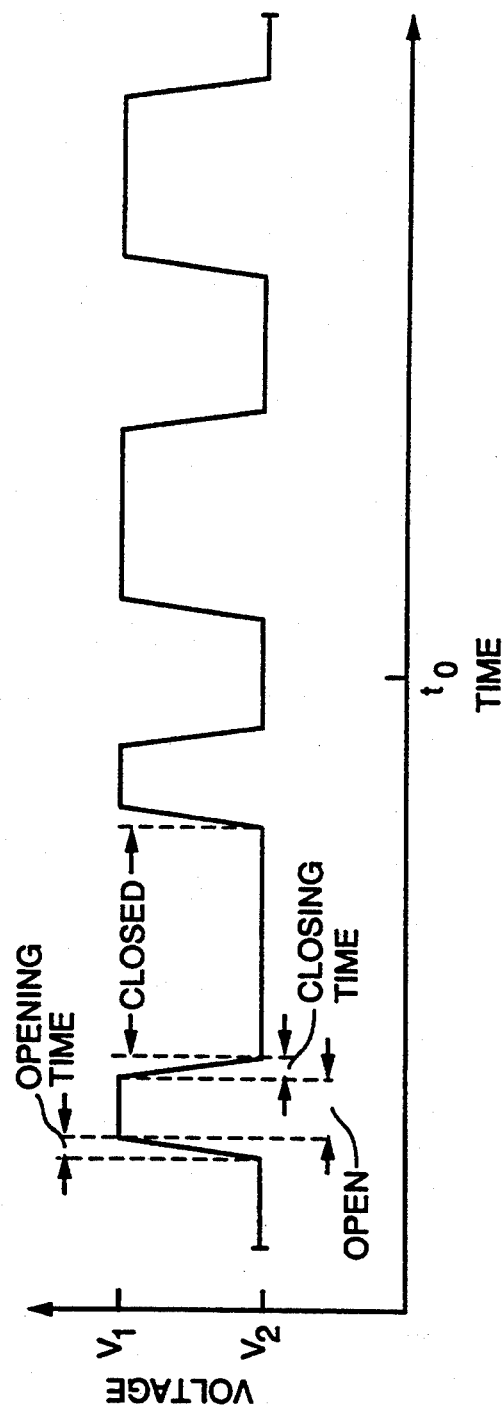
FIG. 2 is an illustration of a pulse width modulated frequency signal used in accordance with the present invention to control an expansion valve.

FIG. 2 shows a sample waveform for the control signal 32. The waveform is a digital square wave which alternates between a maximum control voltage $V_1$ and a minimum control voltage $V_2$. When the waveform is in the maximum control voltage $V_1$, the valve 16 is moved to the fully open condition, and when the waveform is in the minimum control voltage $V_2$, the valve 16 is moved to the fully closed condition. Instead of an instantaneous voltage change, the pulse width modulated waveform shown in FIG. 2 has a brief transition period between the maximum and minimum voltages. This avoids the problem of a pressure shockwave being generated in the refrigerant which can occur when an expansion valve is abruptly opened and closed. The frequency of the waveform is constant regardless of system flow rate demand conditions. Preferably, this frequency is set in the range of about 0.1–2 hertz.

The average flow rate through the expansion valve 16 is dependent on the duty cycle of the pulse width modulated waveform. Thus, prior to the time $t_0$ shown in FIG. 2, the time the valve 16 is fully open is less than the time the valve 16 is fully closed, thereby producing a relatively low average flow rate. After time $t_0$ (at which time increased liquid level in the phase separator 15 is detected), the controller 26 adjusts the duty cycle so that the time the valve 16 is fully open is increased with respect to the time the valve 16 is fully closed, thereby producing a larger average flow rate.

Preferably, the expansion valve 16 is a normally closed valve; that is, the valve 16 closes when the solenoid coil is not energized. This means that the minimum control voltage $V_2$ can be zero for valve closure. Furthermore, power to the valve 16 is interrupted whenever the compressor 12 is shut down. The valve 16 thus remains closed during periods of compressor shutdown. This prevents refrigerant migration to the evaporator 18 during the off cycle, thereby conserving energy. The solenoid valve 16 therefore acts as an energy valve, eliminating the need for a separate valve to serve this function.

The controller 26 can comprise one of a variety of pulse width modulation control schemes known in the art. Suitable pulse width modulation controllers are described in U.S. Pat. No. 4,651,535 issued Mar. 24, 1987 to Richard H. Alsenz and in U.S. Pat. No. 5,255,530 issued Oct. 26, 1993 to Donald E. Janke, both of which are herein incorporated by reference.

The liquid level sensor 28 can be almost any type of liquid level sensing device known in the art. One type of sensor suitable for the present invention is a sensor which provides a continuously variable current or voltage signal as a function of the liquid level. In this case, the control signal 32 would be continuously adjusted according to the liquid level. Thus, the average flow rate through the valve 16 would be closely controlled in response to the liquid level in the phase separator 15. Another less precise but less expensive approach would be to use a liquid level switch such as a float switch. A liquid level switch only indicates whether the liquid level is above or below a set level. In the present invention, the control signal 32 would be provided with a relatively large pulse width if the liquid level in the phase separator 15 was above the set level and a smaller pulse width if the liquid level was below the set level.

Figure 3:
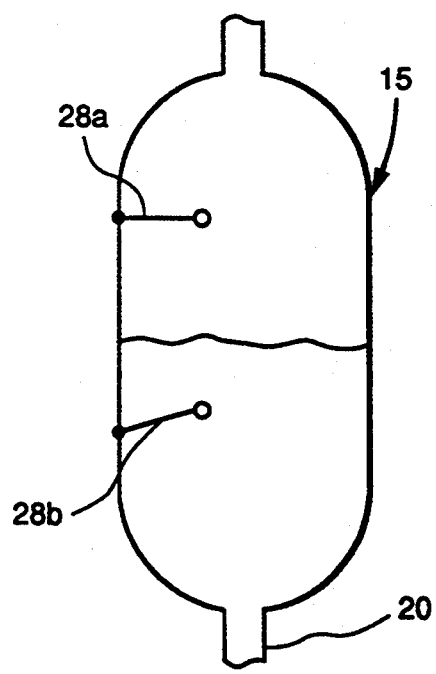
FIG. 3 is a schematic representation of a liquid level sensing configuration which uses two liquid level switches.

FIG. 3 shows an alternative configuration which uses two liquid level switches. A first liquid level switch 28a is positioned in the phase separator 15 at a point of maximum desired liquid level, and a second liquid level switch 28b is positioned at a point of minimum desired liquid level. The pulse width of the control signal would be set for a normal flow rate through the valve 16 as long as the actual liquid level was between the two liquid level switches 28a, 28b. Whenever the liquid level exceeded the maximum level, the first liquid level switch 28a would be triggered and the pulse width of the control signal 32 would be increased. Whenever the liquid level fell below the minimum level, the second liquid level switch 28b would be triggered and the pulse width of the control signal 32 would be decreased. In addition, if, after a given period of time following one of the liquid level switches 28a, 28b being triggered and the pulse width being adjusted accordingly, the liquid level has not returned to a normal level, then the pulse width would be further increased or decreased, depending on which liquid level switch was triggered.

The foregoing has described an improved refrigeration system which uses a pulse width modulated solenoid valve for expansion control. The valve is controlled on the basis of phase separator liquid level. While specific embodiments of the present invention have been described, it will be apparent to those skilled in the art that various modifications thereto can be made without departing from the spirit and scope of the invention as defined in the appended claims.

What is claimed is:

1. A refrigeration system comprising:
    a compressor, a condenser, a phase separator, a pulse width modulated solenoid valve, and an evaporator all connected in a closed series loop;
    a liquid level switch disposed in said phase separator; and
    a controller for controlling the duty cycle of said pulse width modulated solenoid valve, said controller having an input connected to said liquid level switch.

2. The refrigeration system of claim 1 wherein said controller produces a control signal having a first pulse width when the liquid level in said phase separator is above said liquid level switch, and said controller produces a control signal having a second pulse width when the liquid level in said phase separator is below said liquid level switch, said first pulse width being larger than said second pulse width.

3. The refrigeration system of claim 1 further comprising an additional liquid level switch disposed in said phase separator and connected to an input of said controller, said additional liquid level switch being positioned below said first-mentioned liquid level switch.

4. The refrigeration system of claim 3 wherein said controller increases the pulse width of its control signal when the liquid level in said phase separator is above said first-mentioned liquid level switch, and said controller decreases the pulse width of its control signal when the liquid level in said phase separator is below said additional liquid level switch.

5. A method of controlling refrigerant flow rate in a refrigeration system having a phase separator and a pulse width modulated solenoid valve, said method comprising the steps of:
    sensing the liquid level in said phase separator with a liquid level switch; and
    adjusting the duty cycle of said pulse width modulated solenoid valve based on the liquid level in said phase separator.

* * * * *